United States Patent [19]

de Valroger

[11] 4,286,198

[45] Aug. 25, 1981

[54] DIRECT CURRENT MOTOR UNIT WITHOUT COMMUTATOR

[75] Inventor: Pierre de Valroger, Paris, France

[73] Assignee: Valbrev S.A.R.L., Paris, France

[21] Appl. No.: 38,188

[22] Filed: May 11, 1979

[30] Foreign Application Priority Data

May 11, 1978 [FR] France ............................ 78 13999

[51] Int. Cl.³ .............................................. H02P 6/02
[52] U.S. Cl. .................................. 318/138; 318/254;
318/439; 310/49 R; 310/156
[58] Field of Search ............... 318/138, 254, 439;
310/49, 68 C, 156

[56] References Cited

U.S. PATENT DOCUMENTS

| | | | |
|---|---|---|---|
| 3,883,633 | 5/1975 | Kohler | 318/138 |
| 4,156,168 | 5/1979 | Vogel | 318/138 |

*Primary Examiner*—J. V. Truhe
*Attorney, Agent, or Firm*—Watson, Cole, Grindle & Watson

[57] ABSTRACT

An electronic power supply device for driving a D.C. commutatorless motor utilizes a plurality of driving coils for supplying power to the motor and at least one control coil, magnetically interconnected with the driving coils, to generate a control signal in response to operation of the motor such that a power transistor, having an output connected to the driving coils, and an input controlled by the at least one control coil to provide the driving current to the driving coils. A Zener diode having a nominal breakdown voltage lower than the breakdown voltage of the power transistor is interconnected therewith.

In modifications of the power supply device a flip-flop circuit, controlled by a control signal generated by the at least one control coil, controls the commutation of the motor by controlling the conduction of the power transistor. Speed regulation and temperature compensation of the electronic power supply device are obtained by the use of potentiometer feedback from an output of the at least one control coil and a temperature responsive resistance, respectively.

8 Claims, 18 Drawing Figures

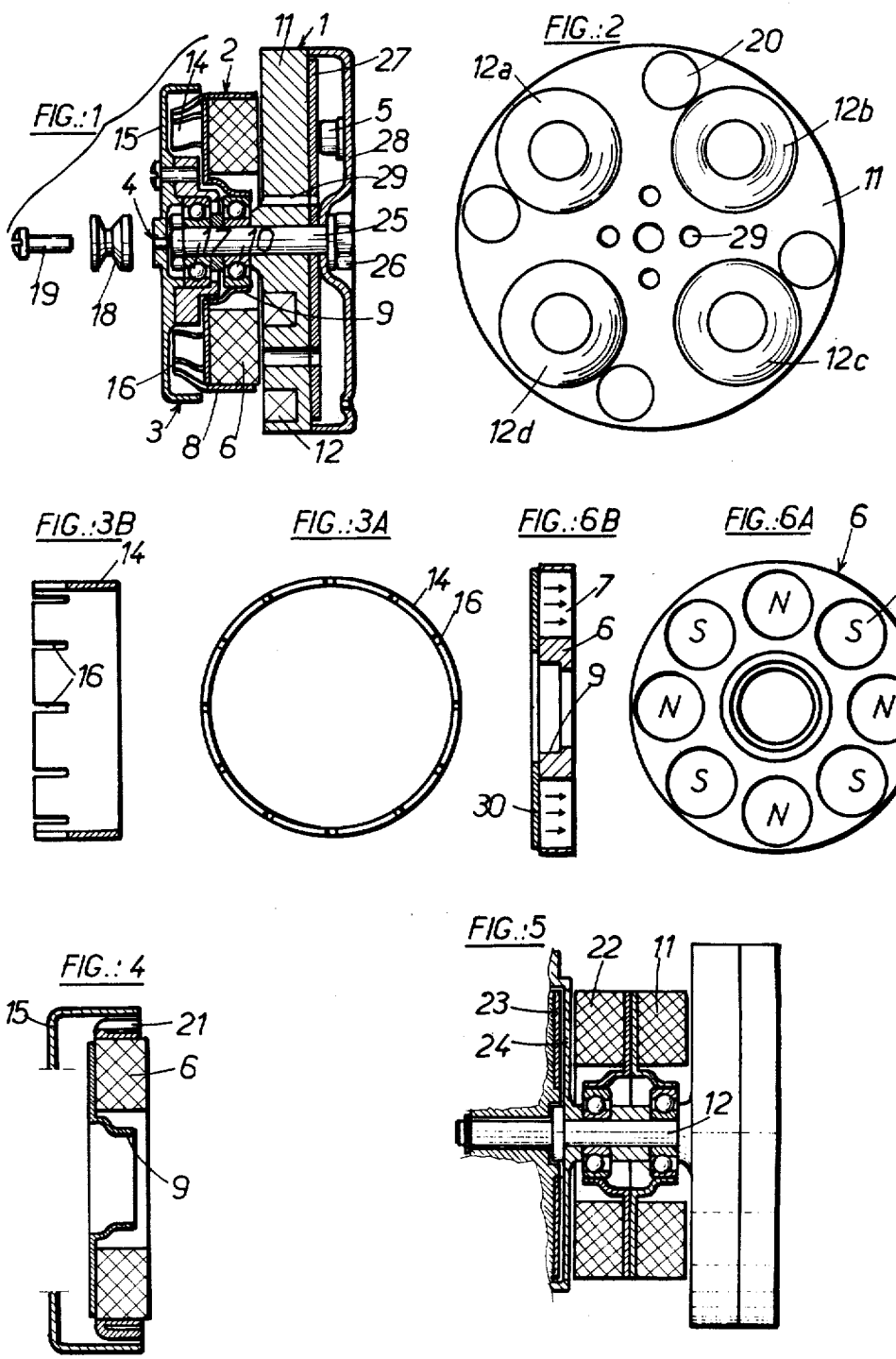

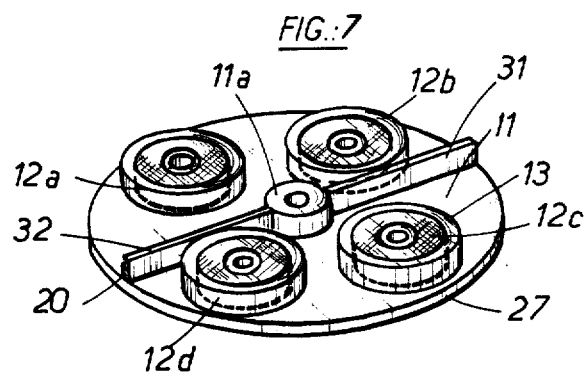
FIG.:7
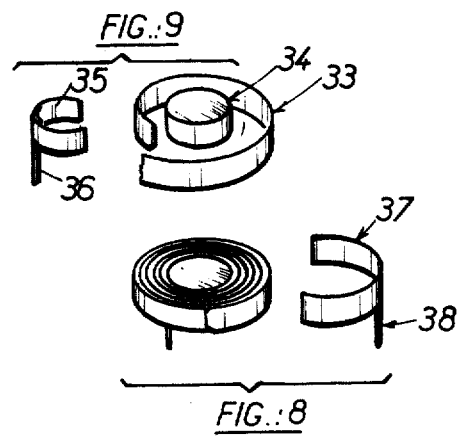
FIG.:9
FIG.:8
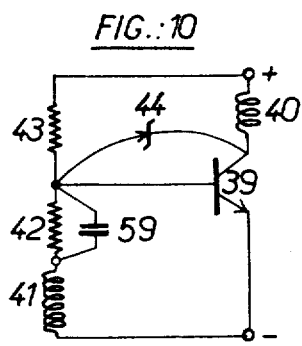
FIG.:10
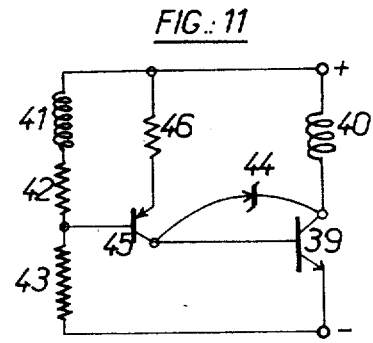
FIG.:11

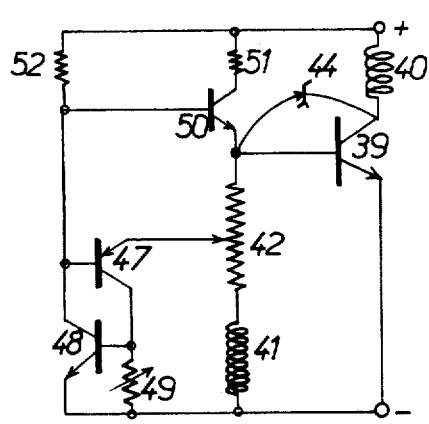
FIG.:12
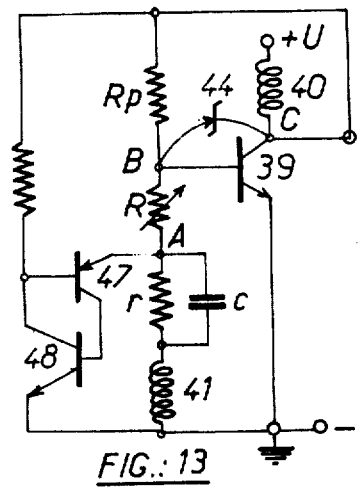
FIG.:13
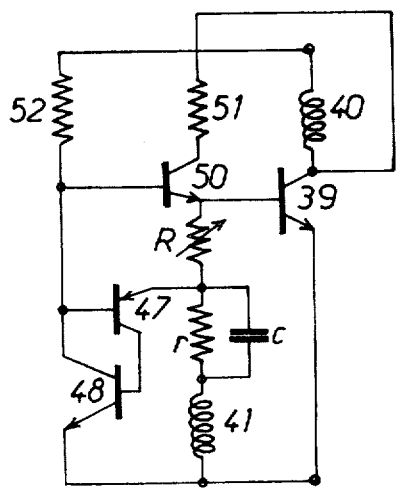
FIG.:14
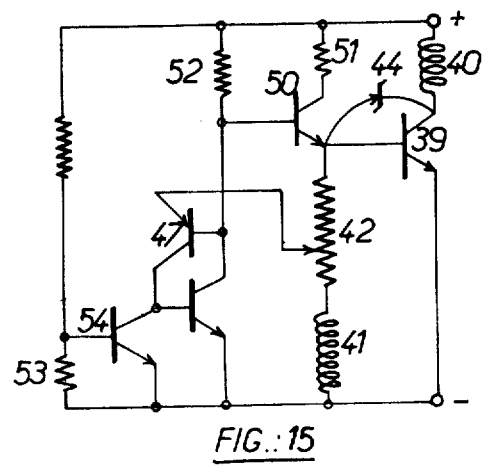
FIG.:15
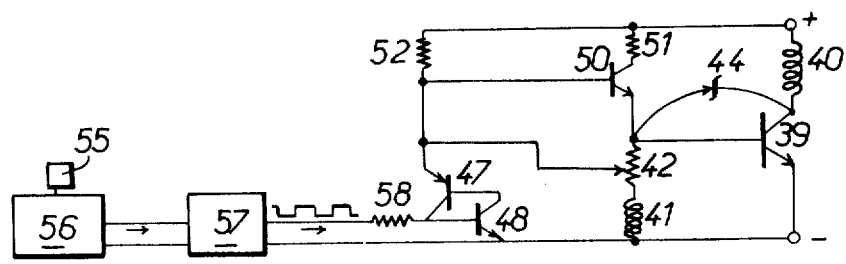
FIG.:16

DIRECT CURRENT MOTOR UNIT WITHOUT COMMUTATOR

BACKGROUND FIELD OF THE INVENTION

The present invention relates to electronic power supplies for commutatorless DC motors, and more particularly to such devices for providing make-and-break direct current to the driving coils of the motor controlled by at least one control coil thereof.

PRIOR ART

French Pat. No. 1,516,085 teaches the principles of running and realization of such DC motors without commutator and with a flat construction. The rotor is made of a multipolar magnetized ring which rotates in front of a stator comprising a plurality of cylindrical or trapezoidal coils. The coils are driving except at least one which is collecting. The driving coils are supplied with direct current through the collector emitter circuit of a transistor which acts as current breaker. The collecting coil detects the passing of the rotor poles and delivers a signal which acts on the transistor base, and causes that transistor to be blocked or saturated at chosen instants.

The first manufactured motors had a very low starting moment. In such cases, it is necessary that the rotor at rest has a given position with respect to the coils for starting in the desired direction. In consequence of the low starting moment, the position secured by magnetized studs should be very weak. This restriction has the drawback that the rotor is not sufficiently held and can turn under any bias in the direction opposed to the desired direction, and so turn towards the direction opposed to that provided for.

SUMMARY OF THE INVENTION

In view of avoiding these drawbacks, the invention has for its primary objects:

to provide a motor unit in which the rotor does not require any control whatsoever from an operator, at least in the starting phase;

to allow the use of magnetic materials in the stator, because, if they cause a troubling magnetic picking up moment, this moment can be counterbalanced by a strong positioning giving the good starting positions;

to allow the use of stronger positioning studs, accordingly a better picking up and a greater security of starting;

a precise regulation speed by means of a reliable electronic supply circuit.

The motor unit according to the invention, comprising a DC motor without commutator, comprising a disclike stator holding the driving coils and the control coil, in front of which rotates a rotor comprising a multipolar magnetic member, a driving shaft, an electronic supply device of make-and-break direct current for the driving coils, is noteworthy in that said unit comprises between the rotor and the driving shaft, mechanical isolation means, such means isolating the rotor from the driving shaft at least during the starting of the motor.

BRIEF DESCRIPTION OF THE DRAWINGS

The invention will be more fully understood by reference to the following detailed description and accompanying drawings, wherein:

FIG. 1 is a sectional view of an embodiment of a motor unit according to the invention, FIG. 2 is a view of the stator of motor of FIG. 1, FIGS. 3a and 3b are a front elevational view and a sectional view, respectively, of the resilient sleeve fitted on the motor unit of FIG. 1, FIG. 4 shows mechanical isolating means using a U-shaped ring, FIG. 5 shows another embodiment of the mechanical isolating means, FIGS. 6A and 6B show, in front and in section, respectively, an embodiment of the rotor according to the invention, FIG. 7 is a perspective view of a stator with coils embedded in ferrite half-pots, FIG. 8 is a perspective view of a coil formed with a tape and its holding and electrical contact clip, FIG. 9 is a view showing the holding electrical contact means of the central end of the coil, FIG. 10 is a schematic view of a motor, with protection means for the Darlington transistor, FIG. 11 is a diagram of a supply circuit for a motor running under a very low voltage, with a protection device for the commutating transistor, FIG. 12 is a diagram of a supply circuit with a regulation of the motor speed, FIG. 13 is a diagram of an other embodiment of a regulated supply circuit, FIG. 14 is a diagram of a regulated third embodiment of a supply circuit, FIG. 15 is a diagram of a temperature regulated supply circuit, and FIG. 16 is a diagram of a supply circuit with synchronization of the motor by a reference frequence.

DETAILED DESCRIPTION

FIG. 1 is a sectional view of a motor unit according to an exemplary embodiment. The motor unit comprises a stator 1, a rotor 2, mechanical isolation means 3, a driving shaft 4 and an electronic supply 5 represented schematically by a transistor.

Rotor 2 is formed by a multipolar magnetized ring, having for example, eight poles N and S in turns on each plane face. This ring may also be, as represented in FIGS. 6A and 6B, a flat ring of plastic in which are embedded cylindrical magnets 7. In the embodiment shown in FIG. 1, ring 6 is supported by a revolution member 8, formed of punched steel for example, which has a plane face on which ring 6 is magnetically engaged. In its central part, member 8 has a bore 9 covering the outer ring of a roller bearing 10. Member 8 enables the mounting and rotation of ring 6.

Stator 1 comprises a base 11 and coils 12 housed in holes symetrically disposed, as shown on FIG. 2. The base may be of plastic and is then suitable for uses requiring high revolving speeds, such as in gyroscopes. For conventional uses requiring not so high speeds, the base is made of a material which concentrates the magnetic field, such as a polymerizable resin loaded with iron or ferrite powder. The base may also be made partially with a material concentrating the magnetic field, and formed for example, of a plastic in which are embedded half pots in ferrite, holding the coils, or merely standard ferrite half-pots 13 adhered to the printed circuit (FIG. 7).

Coils 12, fixed in their holes by glue, are of two types: driving and collecting. In the shown embodiment there are four coils, three with thick wire, driving coils 12a, 12b, 12c, are series connected, the assembly of this coil means securing the rotation of the magnetized ring 6 under the effect of the Laplace forces acting by successive pulses. A fourth coil 12d is a collecting or controlling coil, comprising a coil of very thin wire, for example 50/um to provide a voltage greater than 1 V for a low speed of about 1/10 rps, which voltage acts on the electronic supply and causes the commutation, which causes a power pulse to pass in the driving coils for given positions of the magnetized ring.

The mechanical isolation means 3 (FIG. 1) are formed by several elements: a resilient ring 14 mounted on rotor 2 and a hollow cylindrical member 15 encompassing at least a part of the ring. The ring shown on FIGS. 3A and 3B is formed by a cylindrical sleeve of a resilient material, for example rubber, of a diameter slightly inferior to that of rotor 2, so that it is possible to force it on the rotor outer periphery and so to be maintained on it. This sleeve is formed at its periphery, on a part of its length, with longitudinal cuts 16, which according to the material choosen, provides a higher flexibility to the sleeve in the radial direction. The member 15, which serves as a driving shaft, is rotatably mounted on a roller bearing 17. In the embodiment of FIG. 1, a pulley 18 is fixed by a screw 19 on the hollow cylindrical member 15.

The mechanical isolating means operates in the following manner. During the starting of the motor, the rotor, mechanically isolated from the driving shaft to which are connected the devices to be driven, moves in the required direction of rotation, as determined by the positions of magnetic positioning studs 20. Under the effect of centrifugal force, the free part of sleeve 14 spreads outwards and engages the inner surface of the cylindrical member 15 and carries it along. It is easy to understand that this construction of the driving transmission preserves the rotor of every handling, deliberate or not, during the starting of the motor.

FIG. 4 shows a second embodiment of the resilient ring 21 which is made in a U-shape. The inner lip of the ring encompasses the magnetized ring, while the outer lip is extended during the rotation and engages the inner surface of member 15 and carries it along in rotation.

FIG. 5 shows a third embodiment in which the rotor 11 is fitted with a multipolar magnetized ring 22, or other similar device, the polar faces of which are moving in front of a disc 23 of a metal which is a good conductor of electric current, and which is connected rigidly with the member to be driven. Such disc may be supported by means fixed on the motor base, or by independent means, and in this latter case, the transmission may be made through an insulating partition 24.

In the embodiments shown in FIGS. 1, 4 and in an other example hereinabove described, all the mechanical parts are supported by a roller bearing the inner ring of which is stationary, pressed on base 11 by a shaft 25 maintained by a six-sided nut 26. The electrical part forms a removable unit formed in the greater part by the base 11, which allows the use of magnetic materials but of low mechanical resistance.

The electronic part is located on a printed circuit card 27, laid on the base 11. The components mounted on the circuit, particularly the commutating transistor 5, are protected by a cover 28. This cover made of aluminum serves as a heat sink for the transistor. For preventing the heating of the coils, there is provided (FIGS. 1 and 2) holes 29 in the base. Because of the centrifugation of air in the narrow space between the magnetized ring 6 and base 11, air is drawn in the holes and strongly cools the base and the coils.

Particular embodiments of the rotor and the stator of the motor are shown on FIGS. 6A and 6B and FIG. 7.

FIGS. 6A and 6B represent a rotor comprising magnetic studs 7, the magnetic circuits of which are closed in a steel disc 30 magnetically laid on the plastic disc 6. Static balance of such a rotor is obtained by radial adjustment of disc 30 until the rotor runs true.

FIG. 7 relates more particularly to a stator formed by the printed circuit card 27 on which are glued the half-pots 13 in ferrite, for receiving coils 12a, 12b, 12c, 12d. A hub 11a is fixed in the middle. According to other embodiments, the cylindrical or parallelepipedical positioning magnets are glued in the desired position near the coils, as in the examples of the figures. The positioning magnet can also, as represented on FIG. 7, be formed by one or several magnetic strips, more particularly a steel strip the ends of which are L-curved, and in which magnets are fixed, said strip being fixed at its middle on the hub. In an other embodiment, steel strips 31, 32 may be set at one end in hub 11a, and turned with said hub near coils 12b, 12d, for example, or near coils 12a, 12c according to the desired direction of starting.

In a preferred embodiment, shown on FIGS. 8 and 9, the driving coils are each made of a winding formed by a metallic band or tape, for example of aluminium, insulated on one face by a pellicular layer of varnish or insulating oxide. Amongst the advantages of these coils, the preferred are: a maximum filling factor, and the use of a very thin aluminium tape insulated on one face. The winding of tape 33 can be made on an insulating cylindrical member or mandrel 34, the fixing being provided by clasping of an open resilient ring 35 forming a spring. The connection to the printed circuit, by welding, can be made by means of a wire 36, the upper part of which is flattened and curved so that it can be interleaved between the tape and the ring, to which this part can be welded. In the same manner, at the other end of the coil, a ring 37, of greater diameter is set to grasp the cake formed by the rolled tape. This ring lays on the outer part, not insulated, the flattened part of wire 38.

For providing the power supply to the motor, the most simple electronic wiring is shown on FIG. 10. The Darlington transistor 39 supplies in on-off connecting way the driving coils 40. The passage of corresponding power is secured when a positive voltage is applied on the base of the transistor. This voltage is provided by the collecting or control coil 41 connected to the base through a resistor 42. The shutting off of the power supply is caused by the presence of a negative voltage, applied by the control coil 41 to the base in spite of the positive supplied by the biasing resistor 43, which indirectly causes, during the supply, a power securing the starting of the motor.

When the driving coils inductance is very high, which is the case when the material forming the base is strongly magnetic, a significant overvoltage can appear in the transistor collector, to put it out of duty, when the power is suddenly cut off, the transistor passing from a saturation to a blocking state. In a conventional manner, there is provided a Zener diode, able to bear the whole overvoltage between emitter and collector of the transistor. If there is provided only one Zener diode of low power, a power transistor is associated to it in a known manner, that provides the equivalent of a high power diode. According to a feature of the invention, a low power Zener diode 44 is connected between collector and base of the power transistor, or an equivalent montage to a diode, the nominal voltage of which is less than the breakdown voltage of the transistor. This affords the advantages of a low cost and a good efficiency.

The diagram 10 shows also the connection of a capacitor 59, parallel to resistor 42. This capacitor allows the control coil 41 to operate more quickly and so gives a driving pulse with a steep step, and on the other hand, to timely cut-off the operation of the control coil, and so reduce the overvoltage at the pulse end. While only the diagram of FIG. 10 shows such a capacitor, the circuit diagrams shown in the following Figures may also comprise such a capacitor.

FIG. 11 shows a circuit with two complementary type transistors 39 and 45, which is more suitable when the motor is power supplied under low voltage. It so prevents the relatively important losses which occurs between the collector and the emitter of the Darlington transistor. A resistor 46 must then be connected between the positive pole of the source and the emitter of the transistor 46.

FIG. 12 shows a circuit which very simply provides the regulation of the motor speed in cutting the power supply above the prescribed speed, but in resetting it instantaneously under this speed, for each pulse, accordingly without hysteresis effect.

This limit speed corresponds to a voltage determined by resistor 42, here designed as a potentiometer, which is justified since the positive voltage which appears at the junction of coil 41 and potentiometer 42, during a driving pulse, is an increasing function of the rotor speed. This voltage causes the two complementary transistors 47 and 48, to switch above a given threshold. This switching saturates transistors 47 and 48 and blocks transistor 39. It can be delayed in acting on the regulating resistor 49 which acts for blocking transistor 48.

One of the important improvements of the invention is formed by transistor 50 which normally supplies the base of transistor 39 at rest, in view of securing the starting, in biasing transistor 39. This supply is made through resistor 51 and is controlled by the biasing resistor 52. This assembly of components, which takes place of resistor 43 of FIG. 10 is necessary in the case of the improved motors, relatively powerful, which are included in the invention, if an effective regulation is desired. It is actually important that the flip-flop operates for cutting the polarization of transistor 39, if it is desired that this transistor is effectively blocked during the switching.

According to another embodiment (FIG. 13) comprising a flip-flop with two complementary transistors, the base of transistor 39 is put to a voltage near zero when the motor speed is above a given desired value. Transistor 39 is then blocked, and above this speed, the driving pulse is suppressed, which limits the motor speed to the desired value.

The applied voltage is that of point A, located between the upper end of coil 41 where the positive voltage is maximum, and the base B of transistor 39 where the voltage is substantially null when the transistor is saturated.

In altering variable resistor R, the voltage at A is modified for a given speed, and as the flip-flop switches (the two transistors 47, 48 passing from the blocking state to the saturated state) for a given voltage, the regulated speed is then modified.

It is to be noted that the polarization is done, not in proceeding from +U, but from the collector c of transistor 39.

On the one hand, this avoids saturation of transistor 39 at the starting and to block the rotor after starting up. The supply of transistor base B of 39 is in fact reduced when that transistor comes near saturation. It is also possible to start for voltages very near to the nominal supplying voltage, and fairly lower by reducing the resistance of resistor Rp.

On the other hand, when the motor is running and during the driving pulse, transistor 41 saturates transistor 39, which substantially suppresses every polarization. The flip-flop can then cut the supply to node B, which would not be the case if the pulse was supplied.

When the transistor 39 is biased from point C of collector, the circuit of FIG. 14 allows a lower motor speed.

In FIGS. 13 and 14, potentiometer 42 of FIG. 12 has been replaced in a known manner by a variable resistor R and a constant resistor r, parallelly connected with capacitor C.

Proceeding from the foregoing circuitry, it is possible to couple to the regulated speed, a parameter interfering in an assembly comprising the motor. FIG. 15 shows such a temperature regulation, in which is interposed a resistor 53 having a high positive temperature factor.

Such a resistor can so operate, according to the invention, on the base of a transistor 54 which blocks the flip-flop in cut-off position, when transistor 54 is saturated. This saturation occurs at the critical temperature at which the resistance of resistor 53 passes from several tens of ohms to several thousands. For this temperature, the flip-flop is no longer operating, i.e., the speed is no longer limited by the regulation. In the case where the motor operates as a fan, the higher speed it is taking causes the temperature to lower, which causes temperature regulation.

FIG. 16 shows an example of a synchronization of the motor with a reference frequency. This frequency is given by a quartz crystal 55, excitated by an oscillator 56. The frequency of the oscillations is reduced and put in form of rectangular signals by the frequency divider 57. The high and low signal levels, corresponding to outlet voltages of several volts and a fraction of a volt, are transmitted through a resistor 58 to the base of transistor 48 of the flip-flop. In the high state, the flip-flop conducts, and transistor 39 is blocked by the voltage drop on its base, as has been explained above. The flip-flop remains conducting as long as the polarity to coil 41 is not inverted. In low state, the coil 41 can operate and the running of the motor is possible.

The synchronization of the motor by such signals is known from French Pat. Nos. 2 186 771 and 2 209 485, but is suited only to clockwork motors, with low polarization. FIG. 14 shows circuitry adapted to relatively powerful motors, strongly polarized. The novelty of this circuitry is to be seen in the fact that the polarization is suppressed when the switching occurs, i.e. when transistors 47 and 48 are saturated, so that the blocking of Darlington transistor 39 is secured; which is the function of transistor 50.

Potentiometer 42 must be set so that the regulated speed is slightly higher than the synchronized speed. The synchronization then occurs automatically.

The improvements brought to the motor unit, as well to the electronic power supply provide a reliable unit, having a strong moment and a rotating speed that is adjustable and regular.

I claim:

1. An electro-mechanical motor unit formed of an electronic power supply device for driving a D.C. commutatorless motor, comprising:
    a stator having a plurality of driving coils for supplying power to said motor for generating an axial magnetic flux, said coils being housed in respective ferrite half-pots of axial generatrices;
    at least one thin-wire control coil magnetically interconnected with said plurality of driving coils and adapted for generating a variable control signal in response to operational speed of said motor;
    a rotor having an axially-magnetized ring;
    at least one magnetized positioning stud on said stator in a location thereof such as to bring said rotor at rest in a precise angular position relative to said stator;
    a motive torque output shaft adjacent to but spaced from said rotor ring;
    rotor speed responsive, centrifugal clutch means interposed between said rotor and said shaft for mechanically interconnecting the same only subsequent to the starting of said rotor;
    a power transistor for generating pulses of current to drive said driving coils and having a collector electrode connected to said plurality of driving coils, a base electrode controlled by said at least one control coil through a resistor; and
    a Zener diode having a nominal breakdown voltage lower than the breakdown voltage of said power transistor and connected between said base and collector electrodes.

2. Motor unit as in claim 1, further comprising a second power transistor connected to said power transistor in a Darlington connection.

3. An electronic power supply device as in claim 2 further comprising a biasing resistor and a first transistor having a base electrode controlled by said at least one control coil and a collector electrode connected to the base electrode of said power transistor, and said biasing resistor being connected to the emitter electrode of said first transistor.

4. An electronic power supply device as in claim 2 further comprising a variable resistor connected between the base electrode of said power transistor for regulating the speed of the motor and a terminal of said at least one control coil, a flip-flop circuit having an input responsive to said control signal and an output for controlling the base electrode of said power transistor.

5. An electronic power supply device as in claim 4 further comprising a first transistor and a biasing resistor, said biasing resistor being connected between the base electrode of said first transistor and a power source, and the emitter of said first transistor being connected to the base of said power transistor.

6. An electronic power supply device as in any of claims 1, 2, 3, 4, or 5 further comprising a capacitor parallelly connected with said resistor connected to said at least one control coil.

7. An electronic power supply device, comprising:
    a plurality of driving coils for supplying power to said motor;
    at least one control coil magnetically interconnected with said plurality of driving coils for generating a control signal in response to operation of said motor;
    a power transistor having a collector electrode connected to said plurality of driving coils, a base electrode controlled by said at least one control coil through a resistor;
    a Zener diode having a nominal breakdown voltage lower than the breakdown voltage of said power transistor and connected between said base and collector electrodes;
    a first transistor and a biasing resistor connecting the base electrode of said first transistor to a power source through said biasing resistor, the emitter electrode of said first transistor being connected to the base electrode of said power transistor, a potentiometer connected between the base of said power transistor and one terminal of said at least one control coil, and a flip-flop circuit having an input connected to the sliding terminal of said potentiometer and an output connected to the base electrode of said first transistor.

8. An electronic power supply device as in claim 7 further comprising a second transistor having a temperature responsive resistor connected between the base and the emitter electrodes thereof for controlling said flip-flop circuit in response to the temperature sensed by said resistor.

* * * * *